United States Patent [19]

Schwitters et al.

[11] Patent Number: 4,479,423
[45] Date of Patent: Oct. 30, 1984

[54] CONTINUOUS-FLOW TYPE APPARATUS FOR PASTEURIZING BATCHES OF PRODUCT

[75] Inventors: Steven W. Schwitters, Rockford; John M. Frazer, Machesney Park, both of Ill.

[73] Assignee: Taylor Freezer Company, Rockton, Ill.

[21] Appl. No.: 553,979

[22] Filed: Nov. 21, 1983

[51] Int. Cl.³ .......................... A23C 3/04; A23C 9/00
[52] U.S. Cl. ...................................... 99/455; 99/453; 99/483; 426/522
[58] Field of Search ................. 99/452, 453, 455, 460, 99/470, 483, 486, 516, 534; 426/522, 521; 165/61, 65, 66; 422/105, 292, 295; 134/59, 94, 105–108, 169 R

[56] References Cited

U.S. PATENT DOCUMENTS

| | | | |
|---|---|---|---|
| 2,256,904 | 9/1941 | Kinter | 165/66 X |
| 2,353,382 | 7/1944 | Barrett | 99/455 |
| 2,822,277 | 2/1958 | Ellertson et al. | 426/522 X |
| 3,268,342 | 8/1966 | Yatuni | 426/522 X |
| 3,289,569 | 12/1966 | Frolich | 99/455 |
| 3,433,147 | 3/1969 | Pedersen | 99/455 |
| 3,731,494 | 5/1973 | Fleck | 99/455 |
| 4,441,406 | 4/1984 | Becker et al. | 99/483 X |
| 4,446,778 | 5/1984 | Cipelletti | 99/455 |

Primary Examiner—Timothy F. Simone
Attorney, Agent, or Firm—Vernon J. Pillote

[57] ABSTRACT

A continuous-flow type pasteurization apparatus for pasteurizing batches of product. The apparatus has a product conduit that defines a continuous flow passage with a heater in heat exchange relation with one section of the conduit to heat the product to pasteurizing temperature as it flows therethrough and cooling coils and refrigeration coils in heat exchange relation with other sections of the product conduit to cool the product. A positive displacement type inlet pump is provided for pumping unpasteurized product from a container to the inlet end of the product conduit and a positive displacement type outlet pump is provided for pumping product from the outlet of the product conduit to a container for pasteurized product. A cleaning system is provided including a cleaning pump for pumping cleaning solution to and from cleaning fluid supply and return fittings located adjacent the inlet and outlet fittings of the product conduit. Transfer hoses connected to the inlet and outlet fittings of the product conduit can be selectively connected to the inlet and outlet product pumps to pump product through the product conduit, or to the cleaning supply and return fittings to pass cleaning fluid through the product conduit.

13 Claims, 4 Drawing Figures

CONTINUOUS-FLOW TYPE APPARATUS FOR PASTEURIZING BATCHES OF PRODUCT

BACKGROUND OF THE INVENTION

In some installations it is desired to pasteurize batches of various different products such as different types of ice cream mix and the like, and where the batch size varies over a wide range. In vat type pasteurization apparatus, the product to be pasteurized is heated in a vat to a temperature in the range of 63 to 69 degrees C. and held at that temperature for about thirty minutes. The vat pasteurization method is relatively slow because of the time required for heating the batch up to pasteurization temperature and the relatively long holding time. In addition, vat pasteurization apparatus is not suitable for relatively large batches since it is necessary to either provide a very large vat that can accommodate the entire batch, or to pasteurize the batch in smaller quantities with a consequent increase in the overall pasteurization time.

Continuous-flow type pasteurization apparatus are commonly used in large milk processing plants. In such continuous-flow type pasteurization apparatus, the product to be pasteurized is pumped by a positive displacement pump through a heating heat exchanger where the product is rapidly heated to a pasteurization temperature, for example in the range of 72 to 80 degrees C. and maintained at that temperature for a short time of the order of fifteen to thirty seconds, and the pasteurized product is then passed through a cooling heat exchanger where it is cooled. Such continuous-flow type pasteurization apparatus work well for pasteurizing very large quantities of product where the pasteurization apparatus can work continuously for long periods. However, the continuous-flow type pasteurization apparatus presents some problems when used for pasteurizing small or moderate batches of product, and particularly relatively viscous products such as ice cream mix and the like, because of the amount of product that remains in the pasteurization apparatus at the end of each batch and which quantity is lost or wasted when the pasteurizer is subsequently cleaned.

SUMMARY OF THE INVENTION

An important object of this invention is to provide a continuous-flow type apparatus for pasteurizing batches of liquid product, and which minimizes the amount of product that remains in the pasteurizing apparatus when pasteurization of the batch is completed, to reduce the amount of product that is lost from each batch.

Another object of this invention is to provide a continuous-flow type apparatus for pasteurizing batches of liquid product, and which has an improved arrangement for cleaning the pasteurizing apparatus, after pasteurization of a batch is completed.

Accordingly, the present invention provides a continuous-flow type apparatus for pasteurizing batches of liquid product comprising a support frame, product conduit means defining a continuous flow passage having an inlet fitting at one end and an outlet fitting at its other end mounted at a selected location on the support frame, product pasteurizing heater means in heat exchange relation with the first section of the product conduit means for heating the product flowing therethrough to product pasteurizing temperature, product cooling means in heat exchange relation with a second section of the product conduit means for cooling the product flowing therethrough, and product feed means including first and second product pumps removably mounted on the frame, the first and second product pumps being of the positive displacement type and each having an inlet and an outlet, and a product pump motor for driving the first and second product pumps to substantially equalize flows therethrough, an inlet hose connected to the inlet of the first product pump for connecting the same to a container of unpasteurized product, a first transfer hose for connecting the outlet of the first product pump to the inlet fitting of the product conduit means for feeding unpasteurized product thereto, a second transfer hose for connecting the outlet fitting of the product conduit means to the inlet of the second product pump for pumping pasteurized product from the product conduit means, and an outlet hose connected to the outlet of the second product pump for delivering the pasteurized product to a container for pasteurized product.

In accordance with another aspect of the present invention, the pasteurizing apparatus also includes a cleaning system for cleaning the product conduit means. The cleaning system includes a cleaning fluid supply fitting and a cleaning fluid return fitting mounted on the support frame, a cleaning fluid pump mounted on the support frame and having an inlet and an outlet and a drive motor for driving the same, a container of cleaning fluid, cleaning fluid inlet conduit means for connecting the inlet of the cleaning fluid pump to the container of cleaning fluid, cleaning fluid supply conduit means for connecting the outlet of the cleaning fluid pump to the cleaning fluid supply fitting, and cleaning fluid return conduit means connected to the cleaning fluid return fittings. Cleaning of the product conduit means is effected by disconnecting the transfer hoses from the product pumps and connecting the same to the cleaning fluid and supply return fittings, to pass the cleaning fluid through the product conduit means when the cleaning pump is operated.

BRIEF DESCRIPTION OF THE DRAWINGS

The pasteurizing apparatus is made as a self-contained unit and has a main support frame 10 including a base 11, an intermediate shelf 12, a top 13 and interconnecting uprights 14. As shown in FIG. 1, a support panel 17 is provided between the shelf 12 and top 13 of the cabinet adjacent the front side of the unit and is preferably recessed inwardly. A divider panel 18 extends between the shelf 12 and the base 11 at the front of the unit to provide a compartment 19 for receiving a cleaning fluid container. The remainder of the sides, rear and top of the cabinet are covered by panels (not shown) that are removable to facilitate servicing.

Figure 1:
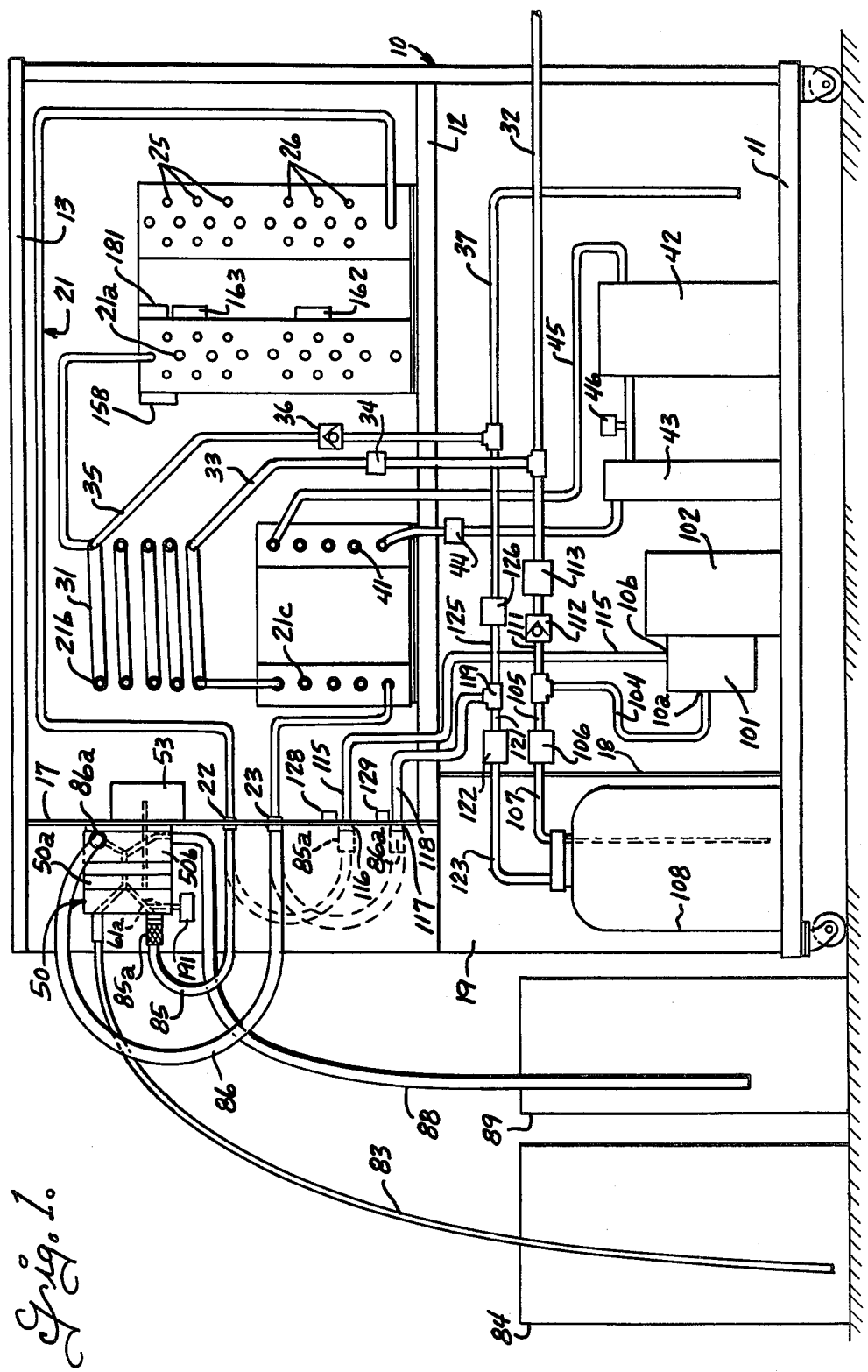
FIG. 1 is a diagrammatic view of a continuous-flow type apparatus for pasteurizing batches of products.

The pasteurizing apparatus includes a product conduit means designated generally by the numeral 21 that defines a continuous flow passage, and which has an inlet fitting 22 at one end and an outlet fitting 23 at its other end. The inlet and outlet fittings 22 and 23 are mounted on the support panel 17 and are herein diagrammatically shown disposed one above the other, it being understood that they could be disposed side-by-side if desired. The product conduit means 21 includes a heater section 21a where the product flowing through the product conduit means is heated to pasteurization temperature; a first cooling section 21b where the pasteurized product is cooled by cooling water, and a second cooling section 21c where the product is further cooled by refrigeration. As diagrammatically shown in FIG. 1, the sections 21a, 21b and 21c are arranged in the product conduit 21 so that product from the inlet fitting 22 will flow serially through the heater section 21a, first cooling section 21b and second cooling section 21c and then to the outlet fitting 23.

The heater section 21a is in the form of a relatively large diameter helical coil and is heated by upper and lower electrical heaters 25 and 26 disposed in an insulated enclosure 27. The diameter and length of the coils of section 21a are selected in relation to the rate of flow of product through the product conduit, to provide time for heating the product flowing through the section 21a to pasteurization temperature of about 80 degrees C. and to maintain the product at that temperature for about thirty seconds, as the product flows through section 21a. The heaters 25 and 26 are preferably shaped into coils and arranged both inside and outside the coils of the conduit section 21a, to provide good heat exchange therebetween. A temperature sensor 163 is mounted to sense the temperature adjacent the upper or outlet portion of the section 21a and a second temperature sensor 162 is mounted to sense the temperature adjacent the lower or inlet portion of the section 21a. The temperature sensors 162 and 163 are connected in a manner described more fully hereinafter to control operation of the electrical heaters 25 and 26 respectively, to maintain the preselected pasteurization temperature. A high limit thermostat 158 and a low limit thermostat 181 are also provided to sense the temperature adjacent the upper or outlet end of the section 21a.

The second section 21b of the product conduit is also conveniently in the form of a helical coil and is enclosed in an outer larger diameter water cooling coil 31. Water is supplied to the cooling coil 31 from a water supply line 32 through a branch line 33 having a control valve 34 therein, and water is returned from the other end of the cooling water coil through a line 35 having a check valve 36 therein and connected to a drain line 37.

The section 21c of the product conduit is also advantageously in the form of a helical coil and is enclosed in an outer evaporator coil 41 of a refrigeration apparatus. As is conventional, the refrigeration apparatus includes a compressor 42, condenser 43 and refrigerant expansion control 44, with the outlet of the expansion control connected to one end of the evaporator coil 41, and with the other end of the evaporator coil connected through a line 45 back to the inlet of the compressor. A normally closed high pressure switch 46 is connected to sense the pressure at the outlet of the compressor, and to open the switch if the compressor pressure exceeds a preselected upper limit which would indicate that the temperature in the evaporator coil is below the freezing temperature of the product.

Figure 2:
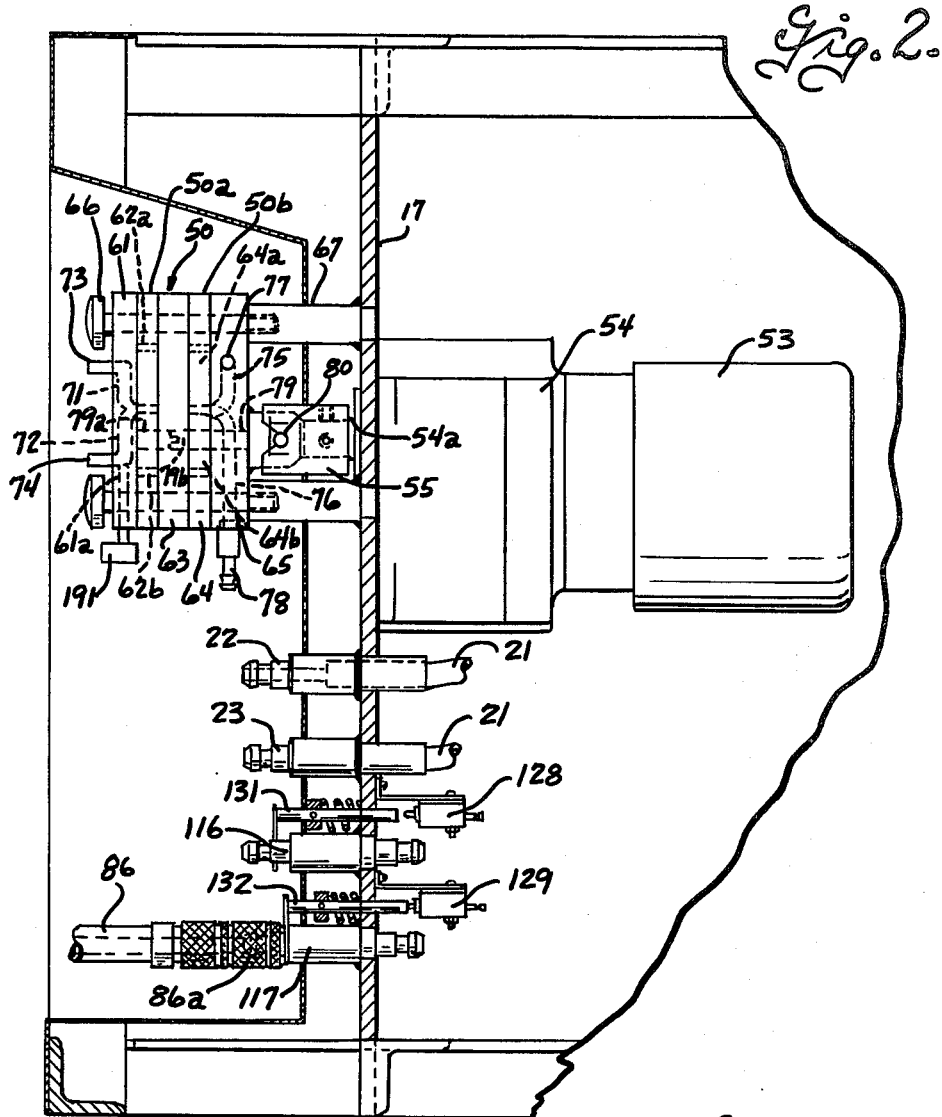
FIG. 2 is a fragmentary view illustrating a portion of the pasteurizing apparatus of FIG. 1 on a larger scale.

A positive displacement type product pump means designated generally by the numeral 50, is provided for pumping product through the product conduit means at a controlled rate. In accordance with the present invention, the product pump means 50 includes a first or inlet product pump 50a for pumping product to the inlet of the product conduit 21a, and a second or outlet product pump 50b for pumping product from the outlet of the product conduit. The product pumps 50a and 50b have the same volumetric capacity and are driven at the same speed by a drive motor 53 through a speed reducer 54. The pump means 50 is mounted on the front side of the support panel 17 so as to be located adjacent the inlet and outlet fittings 22 and 23 of the product conduit and the pump is removably mounted on the panel and constructed and arranged so that it can be easily disassembled for cleaning. As best shown in FIG. 2, the motor 53 and speed reducer 54 are mounted at the rear side of the support panel 17 and the output shaft 54a of the speed reducer extends through an opening in the panel 17 to the front side thereof. A coupling 55 is mounted on the forwardly extending end of the shaft 54a and is arranged to be detachably coupled to the pump input shaft. The pumps are of the gear type and includes a forward end plate 61, a first gear plate 62, an intermediate plate 63, a second gear plate 64, and a rear end plate 65. The several plates 61-65 are held in assembled relation and removably mounted on the support panel 17 by bolts 66 that extend through aligned openings in the several plates, and which are tapped into bosses 67 on the forward side of the support plate 17. The bolts 66 conveniently have large hand knobs at their outer ends to facilitate tightening and loosening of the bolts. The pump plates 62 and 64 have intersecting bores that receive meshing pump gears 62a, 62b and 64a, 64b respectively. Pump inlet and return passages 71 and 72 are formed in the front end plates 61 and communicate at one end with the pump bores in plate 62, at relatively opposite sides of the mesh point of the gears 62a, 62b, and communicate at their other ends with inlet and outlet fittings 73 and 74 respectively. Inlet and outlet passages 75 and 76 are formed in the end plate 65 and communicate with the pump bores in the plate 64, at relatively opposite sides in the mesh point of the gears 64a and 64b, and which communicate at their other ends with inlet and outlet fittings 77 and 78. The pump has an input shaft 79 non-rotatably keyed to the gear 64b of the output pump and non-rotatably coupled at 80 to the coupling 55. The pump also has a stub shaft 79a which is non-rotatably connected to one of the gears 62b in the inlet pump, and the stub shaft 79a is non-rotatably connected as indicated at 79b to the input shaft 79 to be driven thereby.

As best shown in FIG. 1, an inlet hose 83 is connected at one end to the inlet fitting 73 on the inlet pump 50a and has a length to extend at its other end into the bottom of a container 84 containing the liquid product to be pasteurized. A first transfer hose 85 is connected at one end to the inlet fitting 22 of the product conduit 21 and has a coupling 85a at its other end to detachably connect the transfer hose to the outlet fitting 74 of the inlet pump 50a. A transfer hose 86 is connected at one end to the outlet fitting 23 of the product conduit and has a coupling 86a at its other end to detachably connect the transfer hose to the inlet fitting 77 of the outlet pump 50b. A return hose 88 is connected at one end to the outlet fitting 78 of the outlet pump 50b and has a length to extend into a container 89 for receiving pasteurized mix. Thus, when the pump means 50 is operated by the motor, the inlet pump 50a draws product in through inlet hose 83 and delivers the product through transfer hose 85 to the inlet of the product conduit 21. The product flows through the product conduit 21 and is sequentially heated to pasteurizing temperature in the heater section 21a and subsequently cooled in the cooling sections 21b and 21c. The cooled product returns through transfer hose 86 to the inlet of the outlet pump 50b and pump 50b discharges the pasteurized and cooled product through return hose 88 to the container 89.

The pasteurizing apparatus also includes a cleaning system for cleaning the product conduit after completion of the pasteurizing operations. The cleaning system includes a cleaning pump 101 driven by a motor 102. The cleaning pump and motor drive are selected to have a relatively high flow capacity to pump fluid through the product conduit at a high flow rate sufficient to produce turbulent flow of cleaning fluid through the product conduit for cleaning product residue and milk stone from the product conduit. The pump 10 is conveniently of the centrifugal type having an inlet 10a and an outlet 10b. As shown in FIG. 1, the inlet 10a of the cleaning pump is connected through a conduit 104 to a conduit 105 and valve 106 to a hose 107 that extends into a container 108 of cleaning fluid. The inlet of the pump 10a is also connected through conduit 104 and a conduit 111, check valve 112 and flow control valve 113 to the water supply conduit 32. The outlet 10b of the cleaning pump is connected through a conduit 115 to a cleaning fluid supply fitting 116 mounted on the support panel 17. A cleaning fluid return fitting 117 is mounted on the support panel and is connected through a return conduit 118 and T-fitting 119 to a conduit 121 and valve 122 and hose 123 to the container 108 of cleaning fluid, to allow cleaning fluid to be returned to the cleaning fluid container. The return fitting 117 is also connected through line 118 and T fitting 119 and conduit 125 and valve 126 to the drain line 37, to allow selective discharge of the cleaning fluid to drain. The cleaning fluid supply and return fittings 116 and 117 are advantageously located adjacent the product conduit inlet and outlet fittings 22 and 23, and the fittings 116 and 117 are arranged to receive the couplings 85a and 86a of the transfer hoses 85 and 86. Thus, the transfer hoses 85 and 86 can be disconnected from the product pump 50 and connected to the cleaning fluid supply and return fittings 116 and 117 to enable the cleaning pump to pump fluid through the product conduit for cleaning. Limit switches 128 and 129 are mounted on the support panel and arranged to be actuated by sensors 131 and 132 that sense when the hose couplings 85a and 86a are mounted on the fittings 116 and 117.

Figure 3:
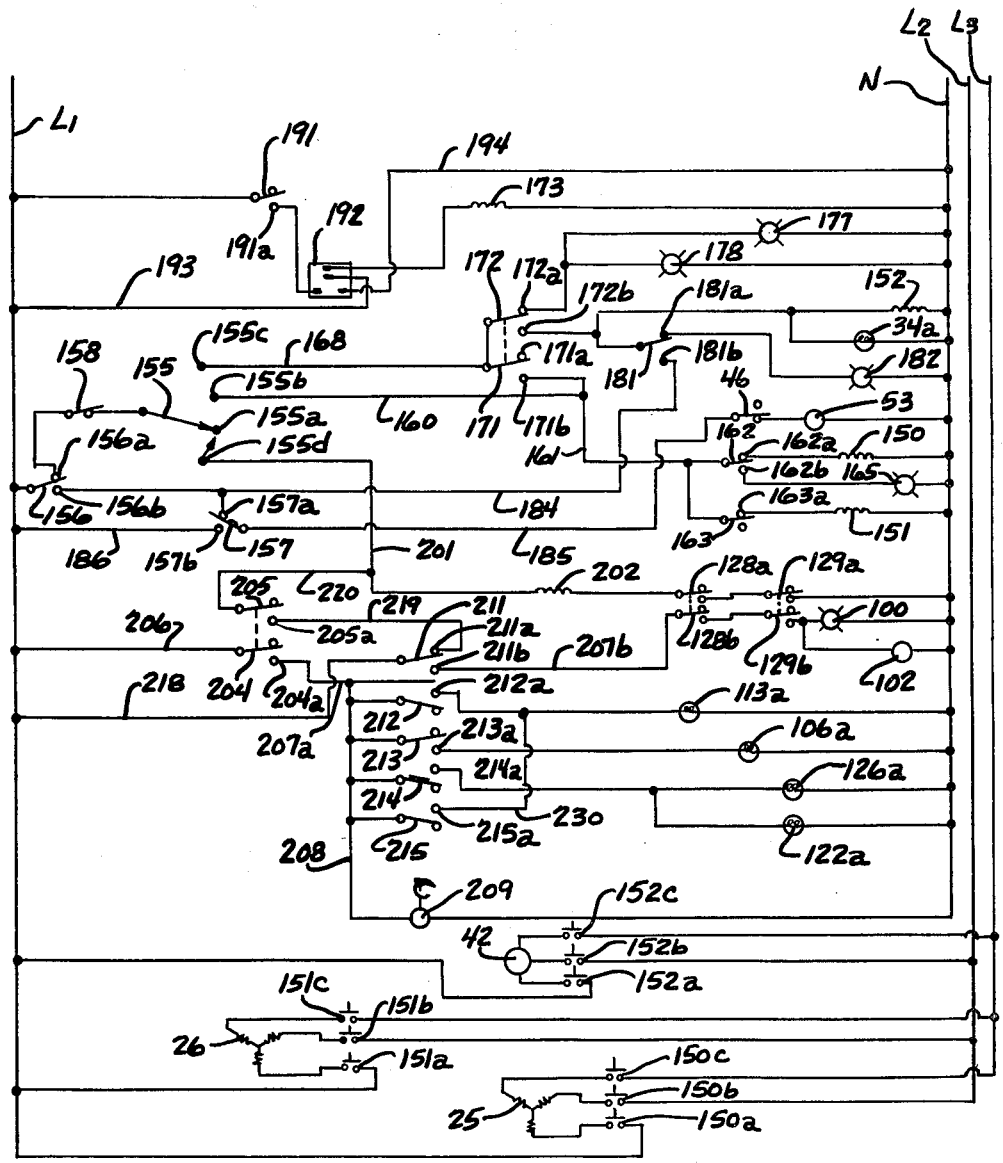
FIG. 3 is an electrical circuit diagram for the pasteurizing apparatus.

The control circuit for the pasteurizing apparatus is schematically illustrated in FIG. 3. The upper heater 25 is connected through normally open relay contacts 150a, 150b and 150c to power supply lines L1, L2 and L3. Similarly, the lower heater 26 is connected through normally open relay contacts 151a, 151b and 151c to the power supply lines L1, L2 and L3. The cleaning pump drive motor 42 is connected through normally open relay contacts 152a, 152b and 152c to the power supply lines L1, L2 and L3. A manually operable selector switch 155 is provided and is movable from an "off" position engaging contact 155a to a "preheat" position engaging contact 155b and to a "pasteurize" position engaging contact 155c. The selector switch is also manually movable to a "cleaning" position engaging contact 155d. A manually operable sanitizer switch 156 is movable between an "off" position engaging contact 156a and an "on" position engaging contact 156b. A manually operable prime switch 157 is conveniently of a pushbutton type which is normally biased into engagement with contact 157a and which can be depressed into engagement with contact 157b, with automatic return to contact 157a when the pressure is released.

Sanitizer switch 156 is connected to power line L1 and contact 156a of the sanitizer switch is connected through a high limit thermostat switch 158 to the selector switch 155. High temperature limit thermostat switch 158 is normally closed and is arranged to sense the temperature at the outlet of the heater section 21a of the product conduit, to open and stop the operation in the event the temperature at that location, through some malfunction, exceeds a predetermined high limit. The "pre-heat" contact 155b of the selector switch is connected through conductors 160 and 161 to a thermostatically operated switch 162 and to a thermostatically operated switch 163. Switch 162 is arranged to sense the temperature adjacent the lower portion of the heater section 21a and engages contact 162a when the temperature is below a preset value and moves into engagement with contact 162b when the temperature rises to the preset value. Thermostat switch contact 162a is connected through a relay coil 150 to the line N and coil 150 is operative, when energized, to close relay contacts 150a–150c to energize heaters 25. Relay contact 162b is connected through an indicator lamp 165 to the conductor N, so that the indicator lamp is energized when the temperature at the lower portion of the heat exchange section 21a reaches the preset value. Thermostat 163 is mounted to sense the temperature adjacent the upper or outlet portion of the heat exchange section 21a of the product conduit and is movable from a position engaging contact 163a when the temperature is below the preset value, and into engagement with contact 163b when the temperature at that location is below the preset value. Contact 163a is connected to a relay coil 151 which operates relay contacts 151a, 151b and 151c to control energization of heater 26. Thus, when the selector switch is moved to its "preheat" position engaging contact 155b, the heaters 25 and 26 will be energized until the heating heat exchange section 21a comes up to pasteurizing temperature, at which time the indicator lamp 165 is energized.

The "pasteurize" contact 155c of the selector switch 155 is connected through conductor 168 to relay operated switches 171 and 172 controlled by relay coil 173. Relay operated switch 171 is normally positioned to engage contact 171a and is moved into engagement with a contact 171b when relay 173 is energized. Contact 171b is connected to conductor 161 so as to maintain a circuit to the thermostatically operated switches 162 and 163 when the switch 171 is moved into engagement with contact 171b. Relay switch 172 is normally positioned to engage contact 172a that is connected to a buzzer 177 and to a yellow "cycle finished" lamp 178. Switch 172 is movable into engagement with contact 172b when the relay coil 173 is energized. Contact 172b is connected to a coil 152 of a relay having contacts 152a, 152b and 152c that control energization of the motor for the compressor 42. Contact 172b of relay 172 is also connected to a solenoid actuator 34a for operating cooling water control valve 34 and is arranged to open the valve 34 when the solenoid is energized. Relay contact 172b is also connected to a thermostat switch 181 arranged to sense the temperature adjacent the outlet of the heat exchange section 21a of the product conduit and thermostat switch 181 engages contact 181a when the temperature is below the desired pasteurization temperature, and it moves into engagement with contact 181b when the temperature rises to the pasteurization temperature. Contact 181a is connected to a red indicator lamp 182 which indicates that the pasteurizer is below the pasteurization temperature. Contact 181b is connected through a conductor 184 to contact 156b of the sanitizer switch 156, and also to contact 157a of the prime switch 157. Prime switch 157 is connected through conductor 185 to the normally closed high pressure switch 46 to the mix pump drive motor 53. Contact 157b of the prime switch is connected through a conductor 186 to the line L1 to establish a circuit to the mix pump drive motor 53 when switch 157 is moved into engagement with contact 157b. The sanitizer switch 156 is connected to the line L1 and will establish a circuit to the mix pump drive motor 53 when the prime switch 157 is in engagement with contact 157a and the sanitizer switch is moved into engagement with contact 156b.

Relay 173 is arranged to be operated while product is being supplied to the pasteurizing apparatus. For this purpose, a pressure switch 191 is provided and communicated through a passage 61a to the outlet passage 72 of the inlet pump 50a. A flow restriction (not shown) is provided in the pump outlet passage 72 at a location downstream of the connection of passage 61a to passage 72, to provide pressure for operating the pressure switch 191. Switch 191 is connected to line L1 and is normally open and moves to its closed position engaging contact 191a when the pressure sensed by switch 191 is above a preselected minimum value. Contact 191a is connected through a time-delay relay 192 to the relay coil 173 to energize the relay coil when pressure switch 191 is closed. The time-delay relay 192 is connected through conductors 193 and 194 to the lines L1 and N and is arranged to maintain a circuit to the relay coil 173 for a short time interval, for example five seconds, after the pressure switch 191 opens. This time delay is provided to prevent spurious operation of the relay 173, in the event a bubble or the like in the product passing from the pump 50a, causes a spurious opening of the pressure switch 191.

The "cleaning" position contact 155d of the selector switch 155 is connected through a conductor 201 to a relay coil 202, and which relay coil is otherwise connected to line N through normally open contacts 128a and 129a of limit switches 128 and 129. Thus, the cleaning cycle relay coil 202 will be energized when the selector switch 155 is moved to its cleaning position engaging contact 155d, only if both limit switches 128a and 129a are operated to their closed position in response to connection of the hose fittings thereto. Relay coil 202 operates normally open relay switches 204 and 205. Relay switch 204 is connected through a conductor 206 to line L1 and its normally open relay contact 204a is connected through conductors 207a and 207b and through normally open contacts 128b and 129b of limit switches 128 and 129 to the cleaning pump 102. A white indicator lamp 100 is connected in parallel with cleaning pump drive motor to indicate when the cleaning pump is operating. Normally open relay contact 204a is also connected through a conductor 208 to a cycle timer motor 209 to energize the same when the cleaning relay coil 202 is energized. Cycle timer motor 209 drives a plurality of cams (not shown) which operate switches 211–215 at predetermined times during the cleaning cycle.

Switch 211 is connected through conductor 218 to line L1 and cam operated switch 211 normally engages contact 211a that is connected through a line 219 to the normally open contact 205a of relay switch 205. Relay switch 205 is connected through a conductor 220 to the relay coil 202. Selector switch 155 has a spring return from its "cleaning" position engaging contact 155d to its "off" position engaging contact 155a and energizes relay coil 202 only when manually held in its cleaning position. When relay coil 202 is energized, it closes relay switch 205 and establishes a latch circuit through normally open contact 211a of cam operated switch 211 to maintain the relay coil 202 energized until the cycle timer drives the cam and moves the switch 211 from a position engaging contact 211a to a position engaging contact 211b. Contact 211b is connected through the conductor 207b and limit switches 128b and 129b to the cleaning pump drive motor 102 to maintain the same energized for the duration of the cleaning cycle and until the cam has moved switch 211 back into engagement with contact 211a. Switches 212–215 are connected through conductor 208 to one normally open contact 204a of relay switch 204 so that power is supplied to switches 211–215 when the cleaning relay coil 202 is energized. The normally open contact 212a of switch 212 is connected to a solenoid actuator 113a for the rinse water valve 113. The normally open contact 213a of cam switch 213 is connected to the solenoid actuator 106a for the cleaning solution valve 106. The normally open contact 214a of cam switch 214 is connected to a solenoid actuator 126a for the normally closed drain valve 126. Contact 214a is also connected to a solenoid actuator 122a for the normally open return valve 122. Normally open contact 215a of switch 215 is connected through a line 230 to the solenoid actuator 113a for rinse water valve 113.

OPERATION

The pump must be assembled and mounted on the machine and the inlet hose 83, transfer hoses 85 and 86, and outlet hose 88 connected to the inlet and outlet pumps as shown in solid lines in FIG. 1. The pasteurization apparatus is first sanitized by positioning the inlet hose 83 into a container (not shown) of sanitizing solution, with the outlet hose 88 positioned in a second receptacle (not shown) to receive sanitizing solution effluent. The sanitizer switch 156 is then moved to its "sanitizing" position engaging contact 156b and this establishes a circuit through a normally closed contact 157a of the prime switch 157 to the mix pump drive motor 54 to drive the mix pump. After a predetermined quantity of sanitizing solution has been pumped through the pump 50 and through the product conduit 21, the sanitizer switch 156 is moved to its "off" position in engagement with contact 156a. The selector switch 155 is then moved to its "preheat" position where it establishes a circuit to the heater relay coils 150 and 151, and the selector switch is allowed to remain in the preheat position until the pasteurizer comes up to pasteurizing temperature, as indicated by illumination of the green indicator lamp 165. The selector switch 155 is then moved to its "pasteurize" position engaging contact 155c. Relay switches 171 and 172 are normally positioned as shown in FIG. 3 and, when selector switch is first moved into engagement with contact 155c it will energize the buzzer 157 and the cycle lamp 178. When the buzzer is energized, the operator depresses the prime switch 157 into engagement with contact 157b and this establishes a circuit to the mix pump drive motor 53. The mix pump then starts pumping product from the mix container 84 and, when the pressure on the product at the outlet of the pump 50a reaches a preselected value, pressure switch 191 is closed and establishes a circuit to relay 173. When relay 173 is energized, it moves relay switch 172 out of engagement with contact 172a to stop the buzzer and into engagement with contact 172b to establish a circuit to the drive motor of the compressor 152 and to also energize the solenoid 34a of the cooling water valve 34. In addition, movement of relay switch 172 into engagement with contact 172b also completes a circuit to the thermostat 181. Since the pasteurizer has been preheated during the preheat cycle, thermostat 181 should be in engagement with contact 181b and this establishes a circuit through conductor 184, contact 157a of prime switch 157 and conductor 185 to the mix pump motor 53 to maintain the mix pump motor energized. Energization of relay coil 173 also moves relay switch 171 into engagement with contact 171b and this establishes a circuit to temperature controlling thermostats 162 and 163 which control energization of the coils 150 and 151 of the heater relays, to maintain the pasteurizer at pasteurizing temperature.

The product is pumped through the product conduit 21 at a controlled rate by the positive displacement mix pumps 50a and 50b and, as previously described, the length and size of the coils in the section 21a of the product conduit are selected in relation to the rate of product flow by the positive displacement product pumps to allow time for the product to be heated to pasteurizing temperature and to remain at pasteurizing temperature for a sufficient time interval for example about thirty seconds, to effect pasteurization of the product before it exits from the heating heat exchanger. The pasteurized product then passes through the water cooled section 21b of the cooling heat exchanger and thereafter through the refrigerated section 21c of the cooling heat exchanger and then back to the outlet fitting 23. The outlet pump 50b pumps the product from the outlet fitting and discharges it through hose 88. A small initial quantity of the product discharged from hose 88 will contain some sanitizing solution and this is discharged to a waste receptacle. Thereafter, the product discharged from hose 88 is delivered to the container 89 for pasteurized product.

When the supply of product is interrupted, as occurs at the end of a batch, the pressure at the outlet of the inlet pump will drop to a lower value and allow the pressure switch 191 to open. This de-energizes relay 173 and stops the mix pump and simultaneously deenergizes the compressor drive motor and the heaters. De-energization of relay coil 173 also reestablishes a circuit to the buzzer 177 and indicator lamp 178 which indicates that the pasteurization cycle has been completed. The operator can then depress the prime switch 157 into engagement with contact 157b, to re-energize mix pump drive motor and cause the outlet pump section 50b to pump substantially all of the remaining product from the product conduit 21. There is usually sufficient residual heat in the heating heat exchanger to pasteurize the remaining product and sufficient residual cooling capacity in the cooling heat exchanger sections to cool the remaining product.

Figure 4:
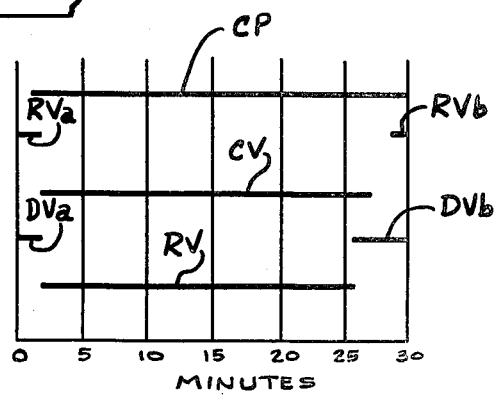
FIG. 4 is a timing diagram of the cleaning cycle for the pasteurizing apparatus.

Cleaning of the pasteurization apparatus after completion of the pasteurization operations is effected by first disconnecting the transfer hoses 85 and 86 from the product pump 50 and connecting the same respectively to the cleaning fluid supply and return fittings 116 and 117. The product pump 50 is then removed and disassembled for cleaning. A quantity of cleaning solution is prepared in the cleaning solution container 108, and automatic cleaning of the product conduit 21 is then effected by momentarily moving the selector switch to its cleaning position 155d. This establishes a circuit to the relay coil 202 and closes relay switches 204 and 205. When relay switch 205 is closed, a holding circuit is established through cam operated switch 211 to the relay coil 202. Closing of relay switch 204 establishes a circuit to the cleaning pump motor 202 and to the timer motor 209 to start the cleaning pump and timer motor. The cleaning pump remains energized for the remaining of the cleaning cycle as indicated by the line designated CP in FIG. 4. The cycle timer cams are arranged to operate cam switch 212 into engagement with contact 212a for a short time interval at the beginning of the cleaning cycle to open the rinse water valve 113 as indicated by the line RVa in FIG. 4, and cam switch 214 is operated to energize the actuator 126a of the normally closed drain valve 126 to open the latter, during this time interval as indicated by the line DVa in FIG. 4, to pass the product rinse to drain. Cam switch 212 is then moved out of engagement with contact 212a to de-energize the rinse water valve 113 and cam switch 213 is moved into engagement with contact 213a to energize the actuator 106a of the cleaning valve 106 to open the same and pass cleaning solution to the inlet of the cleaning pump, as indicated by the line CV in FIG. 4. The solenoid actuator 122a for the normally open recycle valve 122 is connected in parallel with the drain valve actuator 126a so that the recirculating valve 122 is opened when the drain valve 126 is closed and vice versa. Thus, the cleaning fluid is recirculated through a substantial portion of the cleaning cycle as indicated by the heavy line RV in FIG. 4, and the recirculating valve is then closed and the drain valve opened as indicated by the line DVb. Cam switch 215 is also connected to operate the rinse valve actuator 113a and is arranged to open the rinse valve 113 for a short time interval after closing of the cleaning valve, to rinse the cleaning solution from the product conduit as indicated by the line RVb in FIG. 4. Just before the end of the cleaning cycle, the cam operated switch 211 is moved out of engagement with contact 211a and into engagement with contact 211b. This interrupts the holding circuit to relay 202, and establishes a circuit from the line L1 and conductor 218 to the timer motor 209 and cleaning pump motor 102 to maintain the same energized for the remainder of the cleaning cycle. At the end of the cleaning cycle, cam operated switch 211 is moved out of engagement with contact 211b and back into engagement with contact 211a to stop the timer motor and cleaning pump.

During the cleaning cycle, the product conduit 21 as well as the transfer hoses 85 and 86 are cleaned and rinsed. After the product pump is cleaned and reassembled, the transfer hoses 85 and 86 can be respectively reconnected to the outlet of the inlet product pump 50a and to the inlet of the outlet product pump 50b, in the manner previously described.

The embodiments of the invention in which an exclusive property or privilege is claimed are defined as follows:

1. A continuous-flow type apparatus for pasteurizing batches of liquid product comprising, a support frame, product conduit means defining a continuous flow passage having an inlet fitting at one end and an outlet fitting at its other end mounted at a selected location on the support frame, product pasteurizing heater means on the frame in heat exchange relation with a first section of said product conduit means for heating the product flowing therethrough to product pasteurizing temperature, product cooling means on the frame in heat exchange relation with a second section of said product conduit means for cooling the product flowing therethrough, product feed means including first and second product pumps removably mounted on the frame, the first and second product pumps being of the positive displacement type and each having an inlet and an outlet, a product pump motor for driving the first and second product pumps to substantially equalize flows therethrough, an inlet hose connected to the inlet of the first product pump for connecting the same to a container of unpasteurized product, a first transfer hose connected to the outlet of the first product pump and to the inlet fitting of the product conduit means for feeding unpasteurized product thereto, a second transfer hose connected to the outlet fitting of the product conduit means and to the inlet of the second product pump for pumping pasteurized product from the product conduit means, and an outlet hose connected to the outlet of the second product pump for delivering pasteurized product to a container for pasteurized product.

2. A continuous-flow type pasteurizing apparatus according to claim 1 wherein said first and second product pumps have like volumetric capacity and the product pump motor drives the first and second product pumps at the same speed.

3. A continuous-flow type pasteurizing apparatus according to claim 1 wherein said product cooling means includes a refrigeration apparatus having an evaporator section in heat exchange relation with said second section of the product conduit means.

4. A continuous-flow type pasteurizing apparatus according to claim 3 including a water cooling conduit in heat exchange relation with a third section of said product conduit means intermediate said first and second sections, and means for passing cooling water through said cooling water conduit.

5. A continuous-flow type pasteurizing apparatus according to claim 1 including a cleaning system for the product conduit means, the cleaning system including a cleaning fluid supply fitting and a cleaning fluid return fitting mounted on the support frame adjacent said selected location, a cleaning fluid pump mounted on the support frame and having an inlet and an outlet and a drive motor for driving the same, a container of cleaning fluid, cleaning fluid inlet conduit means for connecting the inlet of the cleaning fluid pump to the container of cleaning fluid, cleaning fluid supply conduit means for connecting the outlet of the cleaning fluid pump to the cleaning fluid supply fitting, cleaning fluid return conduit means connected to the cleaning fluid return fitting, and means for selectively connecting the cleaning fluid supply and return fittings to the product conduit inlet and outlet fittings.

6. A continuous-flow type pasteurizing apparatus according to claim 5 wherein said first and second transfer hoses are adapted, when disconnected from said product pumps, to provide said means for selectively connecting the cleaning fluid supply and return fittings to the product conduit inlet and outlet fittings.

7. A continuous-flow type pasteurizing apparatus according to claim 5 wherein said first and second transfer hoses each have quick disconnect fittings adapted for connection respectively to the outlet of the first product pump and the inlet of the second product pump, said quick disconnect fittings being adapted for connection to the cleaning fluid supply and return fittings whereby said first and second transfer hoses provide said means for selectively connecting the cleaning fluid supply and return fittings to the inlet and outlet fittings of the product conduit.

8. A continuous-flow type pasteurizing apparatus according to claim 7 including means for preventing operation of the cleaning fluid pump when the quick disconnect fittings on either of the transfer hoses is not in the respective cleaning fluid supply and return fittings.

9. A continuous-flow type pasteurizing apparatus according to claim 1 including relay means for controlling energization of the product pump motor, a manually operable prime switch for energizing the product pump motor during start-up of a pasteurization cycle, and means including a pressure switch for operating said relay means to de-energize product pump motor when the supply of product to the product feed means is discontinued.

10. A continuous-flow type pasteurizing apparatus according to claim 5 wherein said cleaning fluid return conduit means includes a return conduit having a return valve therein for controlling flow of cleaning fluid from the return fitting to the container for cleaning fluid and a drain conduit having a drain valve thereon for controlling flow of the cleaning fluid from the cleaning fluid return fitting to drain, and timer controlled means for operating the drive motor for the cleaning pump and the return valve and the drain valve to circulate cleaning fluid from the container of cleaning fluid through the product conduit means and back to the container of cleaning fluid for a preselected time and for thereafter passing the cleaning fluid to drain.

11. A continuous-flow type apparatus for pasteurizing batches of liquid product comprising, a support frame, product conduit means defining a continuous flow passage having an inlet fitting at one end and an outlet fitting at its other end, the inlet and outlet fittings being mounted on the frame adjacent a selected location, product pasteurizing heater means on the frame in heat exchange relation with a first section of said product conduit means for heating product flowing therethrough to pasteurizing temperature, product cooling means on the frame in heat exchange relation with a second section of said product conduit means for cooling the product flowing therethrough, product feed means including positive displacement type product pump means removably mounted on the frame adjacent said selected location for pumping product, a product pump drive motor for driving the product pump means, a cleaning fluid supply fitting and a cleaning fluid return fitting mounted on the frame adjacent said selected location, cleaning fluid feed means including a cleaning fluid pump mounted on said frame and connected to said cleaning fluid supply and return fittings, transfer hose means for selectively connecting the product inlet and outlet fittings to either the product feed means to pass product through the product conduit means for pasteurization or to the cleaning fluid supply and return fittings to pass cleaning fluid through the product conduit means.

12. A continuous-flow type apparatus for pasteurizing batches of liquid product according to claim 11 including means for sensing when the transfer hoses are connected to the cleaning fluid supply and return fittings and for preventing operation of the cleaning fluid pump when the transfer hose means are not connected.

13. A continuous-flow type apparatus for pasteurizing batches of liquid product according to claim 11 wherein said product cooling means includes a refrigeration apparatus having a motor driven compressor and a condenser and an evaporator section in heat exchange relation with said second section of said product conduit means, relay means for controlling energization of the product pump motor and the compressor motor, and means including a pressure switch for operating said relay means to de-energize the product pump motor and compressor motor when the supply of product to the product feed pump means is discontinued.

* * * * *